UNITED STATES PATENT OFFICE 2,647,883

COPOLYMERS OF VINYL PHENOLS WITH BUTADIENE COMPOUNDS

Edward Michael Evans, Tonbridge, England, and John Edward Seager Whitney, Penarth, Wales, assignors to British Resin Products Limited, London, England, a British company No Drawing. Application January 10, 1950, Serial No. 137,892. In Great Britain January 13, 1949

10 Claims. (Cl. 260—47)

The present invention relates to the copolymerisation of vinyl phenol-type compounds and has as an object the production of copolymers thereof with butadiene-type compounds.

The polymerisation of vinyl phenols is known, some polymers being resinous materials soluble in aqueous caustic soda, but insoluble in benzene. The polymerisation of butadiene compounds is also known, the polymers being insoluble in aqueous caustic soda. The polymerisation of mixtures of these two types of monomer has, however, not previously been described.

We have found that, by subjecting mixtures of a vinyl phenol-type compound and a butadiene-type compound to polymerisation conditions such as described below, copolymers are formed, the molecules of which contain monomeric units of each type.

It is preferred to exclude oxygen from the reaction mixture to prevent oxidation and resultant discolouration and, when polymerising in aqueous dispersion, it is preferred to maintain a pH of 7 or less for the same reason, although this is not to be regarded as a limiting feature.

Amongst the polymerisation initiators known to be suitable are organic and inorganic peroxy compounds such as acetyl, crotonyl, benzoyl, tertiary-butyl and isopropyl benzene peroxides, peresters, such as tertiary butyl perbenzoate, hydroperoxides such as tertiary-butyl and isopropyl benzene hydroperoxides, hydrogen peroxide and the alkali metal and ammonium persulphates and perborates, ultraviolet light, heat, Friedel-Crafts catalysts, stannic chloride, strong mineral acids, such as hydrochloric and sulphuric acids and activated clays. In some cases, particularly with the more vigorous Friedel-Crafts catalysts and mineral acids, the polymerisation may proceed violently with the formation of a dark-coloured product but, when using a mild catalyst, substantially colourless resins can be produced if oxygen is excluded from the reaction mixture. If desired, when using a peroxy catalyst for dispersion polymerisation, a small concentration of a reducing agent, such as sodium sulphite, may be maintained as in the known Redox polymerisation system.

By "butadiene-type compound" is meant butadiene and its polymerisable derivatives retaining the two conjugated unsaturated linkages, such as isoprene, 2:3 di-methylbutadiene and chloroprene.

By "vinyl phenol-type compound," is meant the ortho-, meta- and para vinyl phenols and their lower nuclear homologues, such as the methyl, ethyl and propyl substituted derivatives, which may be formed by dehydrogenating and/or cracking a phenol substituted open chain hydrocarbon.

The following examples illustrate various embodiments of this invention, the parts referred to being by weight.

*Example 1.*—86.5 parts of meta vinyl phenol, 1 part of tertiary butyl hydroperoxide and 3 parts of isoprene were introduced in the order stated into a thick walled glass ampoule having a constricted neck. The ampoule was then warmed slightly to evaporate 0.5 part of the isoprene, thereby displacing any residual air, sealed immediately and placed in a bath of 100° C. for 24 hours. At the end of this time, the contents had polymerised to a very pale straw coloured clear thermoplast which could be rendered infusible by condensing with an aldehyde or by vulcanisation.

*Example 2.*—50 parts each of o-vinyl phenol and isoprene were introduced into an ampoule, as described above, immersed in an ice-salt bath. The contents were shaken, and then 10 parts of a 20% solution of stannic chloride in benzene were added, while shaking, during a period of 30 minutes. On completion of the catalyst addition the ampoule was sealed while still immersed in the cooling bath, then heated at 55° C., for 2 hours and at 100° C. for 3 hours, at the end of which time a brittle thermoplastic resin had formed.

*Example 3.*—52 parts of meta vinyl phenol, 48 parts of butadiene and 2½ parts of boron trifluoride (as acetic acid complex) were added in the stated order to an ampoule as described above, the latter being cooled to −60° C. during the addition but allowed to warm to −10° C. and shaken before being sealed. It was then maintained at 15–18° C. for 24 hours, slowly heated to 60° C. and finally maintained at this temperature for 48 hours to give a solid thermoplast soluble in equal parts of benzene and alcohol.

*Example 4.*—30 parts of metavinyl phenol and 70 parts of chloroprene containing 1 part of benzoyl peroxide were emulsified in 200 parts of water containing 20 parts of 6% hydrogen peroxide, 5 parts of waxy ethylene oxide polymer and 5 parts of sulphonated castor oil. The resulting emulsion was then refluxed for 48 hours to give a copolymer latex, which could be coagulated in the usual manner to give a rubbery mass.

The novel resins of this invention are characterised by the presence of phenolic hydroxy groups and, in order that these should have a substantial effect on the properties of the resins, it is preferred that the monomer mixture employed should contain at least 2% by weight of the vinyl phenol compound. They may be used as a basis for moulding compositions, adhesives and lacquers, and may be subjected to the cross-linking and/or etherification treatments disclosed in our copending applications Serial Nos. 127,783 and 127,784.

We claim:

1. A process for the production of a synthetic resin which comprises polymerising in the presence of a catalyst a mixture of a vinyl phenol compound selected from the group consisting of meta- and para-vinyl phenols and lower alkyl-nuclear-substituted meta- and para-vinyl phenols, with a compound selected from the group consisting of butadiene, isoprene, dimethyl butadiene and chloroprene, said compounds of the mixture being the sole polymerisable compounds employed.

2. A process as set forth in claim 1, wherein said mixture contains at least 2% by weight of the vinyl phenol compound.

3. A process as set forth in claim 2, wherein the vinyl phenol compound is meta-vinyl phenol.

4. A process as set forth in claim 1, wherein oxygen is excluded from said mixture during the copolymerisation.

5. A process as set forth in claim 1, wherein the polymerisation is effected in aqueous dispersion in the presence of a peroxy catalyst at a pH not exceeding 7.

6. A process as set forth in claim 1, wherein the polymerisation is effected in the homogeneous liquid phase.

7. A copolymer of a vinyl phenol compound selected from the group consisting of meta- and para-vinyl phenols and lower alkyl-nuclear-substituted meta- and para-vinyl phenols with a compound selected from the group consisting of butadiene, isoprene, dimethyl butadiene and chloroprene, said compounds being the sole polymerisable compounds employed, said copolymer containing at least 2% by weight of vinyl phenol units.

8. A copolymer of monomers consisting of metavinyl phenol and butadiene, said copolymer containing at least 2% of meta vinyl phenol units.

9. A copolymer of monomers consisting of metavinyl phenol and isoprene, said copolymer containing at least 2% of meta vinyl phenol units.

10. A copolymer of monomers consisting of meta vinyl phenol and chloroprene, said copolymer containing at least 2% of metavinyl phenol units.

EDWARD MICHAEL EVANS.
JOHN EDWARD SEAGER WHITNEY.

References Cited in the file of this patent

UNITED STATES PATENTS

| Number | Name | Date |
|---|---|---|
| 2,006,517 | Seymour | July 2, 1935 |
| 2,276,138 | Alderman | Mar. 10, 1942 |
| 2,356,974 | Clifford | Aug. 29, 1944 |
| 2,495,458 | Kanning | Jan. 24, 1950 |
| 2,594,579 | Novotny | Apr. 29, 1952 |

OTHER REFERENCES

C. S. Marvel Journal of Polymer Science December 1949 pages 703–707.